United States Patent
Ishii et al.

(10) Patent No.: US 8,925,885 B2
(45) Date of Patent: Jan. 6, 2015

(54) SUPPORT ARM

(75) Inventors: Daisuke Ishii, Toyota (JP); Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/879,827

(22) PCT Filed: Nov. 5, 2010

(86) PCT No.: PCT/JP2010/069718
§ 371 (c)(1),
(2), (4) Date: Apr. 17, 2013

(87) PCT Pub. No.: WO2012/060013
PCT Pub. Date: May 10, 2012

(65) Prior Publication Data
US 2013/0221177 A1    Aug. 29, 2013

(51) Int. Cl.
| | |
|---|---|
| *B66F 19/00* | (2006.01) |
| *B60L 11/18* | (2006.01) |
| *F16M 13/00* | (2006.01) |
| *H01M 10/44* | (2006.01) |
| *B25J 19/00* | (2006.01) |
| B67D 7/00 | (2010.01) |
| B67D 3/00 | (2006.01) |

(52) U.S. Cl.
CPC .................. *F16M 13/00* (2013.01); *B67D 7/00* (2013.01); *B60L 11/1816* (2013.01); *B67D 3/00* (2013.01); *H01M 10/44* (2013.01); *B25J 19/00* (2013.01); *B60L 11/1818* (2013.01); *Y02T 10/7005* (2013.01); *Y02T 10/7088* (2013.01); *Y02T 90/121* (2013.01); *Y02T 90/14* (2013.01); *B60L 11/1877* (2013.01); *Y02T 10/705* (2013.01)
USPC .................. 248/280.11; 248/281.11; 320/115

(58) Field of Classification Search
CPC .............. B25J 19/00; B25J 9/06; B67D 3/00; B67D 7/00; B60L 11/1816; H01M 10/44; F16M 13/00; H02G 15/007
USPC ............ 248/276.1, 292.11, 317, 325, 281.11; 320/114, 115, 2, 109; 439/527
See application file for complete search history.

(56) References Cited

U.S. PATENT DOCUMENTS

| | | | |
|---|---|---|---|
| 3,905,200 | A * | 9/1975 | Ylinen .......................... 405/175 |
| 5,306,999 | A | 4/1994 | Hoffman |
| 6,689,075 | B2 * | 2/2004 | West ............................... 601/23 |

(Continued)

FOREIGN PATENT DOCUMENTS

| | | | |
|---|---|---|---|
| EP | 2617532 | * | 7/2013 |
| JP | A-52-27518 | | 3/1977 |

(Continued)

*Primary Examiner* — Tan Le
(74) *Attorney, Agent, or Firm* — Oliff PLC

(57) ABSTRACT

A support arm supports a charge connector which can be connected to a vehicle. The support arm includes a parallelogram linkage provided in a freely swingable manner, a gravity compensation apparatus for generating force canceling gravity acting on the parallelogram linkage, and a charge connector having a support shaft insertion portion supported by the parallelogram linkage and provided to be rotatable around the support shaft insertion portion. The support shaft insertion portion is arranged at a position of the center of gravity of the charge connector. According to such a construction, a support arm appropriately exhibiting a gravity compensation function can be provided.

7 Claims, 15 Drawing Sheets

(56) References Cited

U.S. PATENT DOCUMENTS

2006/0230862 A1   10/2006  Miyazaki
2013/0157501 A1*  6/2013  Ishii et al. .................... 439/527
2013/0221177 A1*  8/2013  Ishii et al. ................. 248/299.1

FOREIGN PATENT DOCUMENTS

| | | |
|---|---|---|
| JP | U-60-84294 | 6/1985 |
| JP | A-4-164593 | 6/1992 |
| JP | A-5-103403 | 4/1993 |
| JP | A-6-312891 | 11/1994 |
| JP | A-9-142595 | 6/1997 |
| JP | A-11-5172 | 1/1999 |
| JP | A-2003-89090 | 3/2003 |
| JP | A-2003-181789 | 7/2003 |
| JP | A-2004-299024 | 10/2004 |

* cited by examiner

SUPPORT ARM

TECHNICAL FIELD

The present invention generally relates to a support arm, and more particularly to a support arm for supporting a charge connector connected to a hybrid car, an electric car, or the like.

BACKGROUND ART

A support arm having a gravity compensation function to keep balance with gravity acting on the arm has conventionally been known. In connection with such an apparatus, for example, Japanese Patent Laying-Open No. 2003-181789 (PTL 1) discloses a mechanical gravity compensation apparatus aiming to keep balance of an actuation arm with gravity with a simplified structure with respect to three axes orthogonal to one another in a space.

In addition, Japanese Patent Laying-Open No. 2004-299024 (PTL 2) discloses a cable guide in a joint portion of a robot or the like aiming to realize a shorter dimension of a cable without increase in size of the joint portion. Moreover, Japanese Patent Laying-Open No. 2003-89090 (PTL 3) discloses a multi joint arm mechanism aiming to mitigate drive load of an arm, by counteracting against a weight of each arm having multiple joints with constant tensile force.

CITATION LIST

Patent Literature

PTL 1: Japanese Patent Laying-Open No. 2003-181789
PTL 2: Japanese Patent Laying-Open No. 2004-299024
PTL 3: Japanese Patent Laying-Open No. 2003-89090

SUMMARY OF INVENTION

Technical Problem

A case where the gravity compensation apparatus described above is applied to a support arm for supporting a charge connector connected to a hybrid car, an electric car, or the like is assumed. In such a case, a structure of a power feed port to which the charge connector is connected is different depending on a type of a car, and therefore there is a demand to freely vary a position of the charge connector. As an approach for meeting such a demand, a method of providing a charge connector rotatable with respect to a support arm is considered.

On the other hand, the gravity compensation apparatus includes, for example, a coil spring, and gravity acting on the arm is canceled by force generated by this coil spring. As moment applied from the charge connector to the arm is varied with change in position of the charge connector, however, balance between force generated by the coil spring and gravity acting on the arm is lost. Thus, there is a concern that a gravity compensation function is not appropriately exhibited and the support arm is actuated in a manner different from an operator's intention.

Then, an object of this invention is to solve the above-described problems and to provide a support arm appropriately exhibiting a gravity compensation function.

Solution to Problem

A support arm according to this invention is a support arm for supporting a charge connector which can be connected to a vehicle. The support aim includes a first arm portion provided in a freely swingable manner, a gravity compensation apparatus for generating force canceling gravity acting on the first arm portion, and a charge connector having a support portion supported by the first arm portion and provided to be rotatable around the support portion, The support portion is arranged at a position of a center of gravity of the charge connector.

According to the support arm thus constructed, since the support portion is arranged at the position of the center of gravity of the charge connector, moment applied from the charge connector to the support arm can be prevented from varying with rotational motion of the charge connector. Thus, regardless of a position of the charge connector, balance between force generated by the gravity compensation apparatus and gravity acting on the first arm portion can be achieved. Consequently, a gravity compensation function of the gravity compensation apparatus can appropriately be exhibited.

Further preferably, the support arm further includes a locking mechanism. The locking mechanism is provided in the charge connector and it stops rotational motion of the charge connector with respect to the first arm portion. According to the support arm thus constructed, since the position of the charge connector can be held to be constant, operability during charging can be improved.

Further preferably, the first arm portion has a hanger portion for suspending the support portion from above. The support arm further includes a line routed along the first arm portion and connected to the charge connector. The charge connector is held in such a position that the line is hung downward from the charge connector while external force is not applied. According to the support arm thus constructed, entanglement of the line with the hanger portion can be suppressed.

Further preferably, the charge connector has a grip portion gripped during a charging operation. The grip portion is arranged below the hanger portion while external force is not applied to the charge connector. According to the support arm thus constructed, an operator can grip the grip portion without being blocked by the hanger portion.

Further preferably, the charge connector has a grip portion gripped during a charging operation, a connection portion which can be connected to the vehicle, and an intermediate portion provided to extend from the grip portion to the connection portion. The support portion is arranged between the grip portion and the intermediate portion. According to the support arm thus constructed, such a construction that the support portion is arranged at the position of the center of gravity of the charge connector can readily be obtained.

Further preferably, the support arm further includes a second arm portion provided in a freely swingable manner and coupled to the first arm portion, a line routed along the first arm portion and the second arm portion and connected to the charge connector, and a guide portion provided at a position of coupling between the first arm portion and the second arm portion, for guiding the line.

According to the support arm thus constructed, at the position of coupling between the first arm portion and the second arm portion, with swinging motion of each arm portion, an angle at which the first arm portion and the second arm portion intersect with each other varies. Therefore, by providing the guide portion for guiding the line at that position of coupling, damage to the line can be suppressed.

Further preferably, the guide portion has a curved surface which extends as it curves between the first arm portion and the second arm portion. The line is routed along the curved surface. According to the support arm thus constructed, damage to the line can more reliably be suppressed.

Further preferably, the first arm portion has a first shaft and a second shaft arranged in parallel at a distance from each other and constituting a parallelogram linkage mechanism. The first shaft is arranged above the second shaft when the first arm portion is positioned to extend sideward. The support arm further includes a line fixed to the second shaft and connected to the charge connector.

According to the support arm thus constructed, by fixing the line to the second shaft, carrying of a weight of the line by the first shaft can be avoided. Thus, the first shaft can be lighter in weight.

Further preferably, the second shaft is greater in thickness than the first shaft. According to the support arm thus constructed, since heat generated in the line is transferred to the second shaft having a relatively large thickness, efficient heat dissipation can be achieved.

Advantageous Effects of Invention

As described above, according to this invention, a support arm appropriately exhibiting a gravity compensation function can be provided.

DESCRIPTION OF EMBODIMENTS

Figure 1:
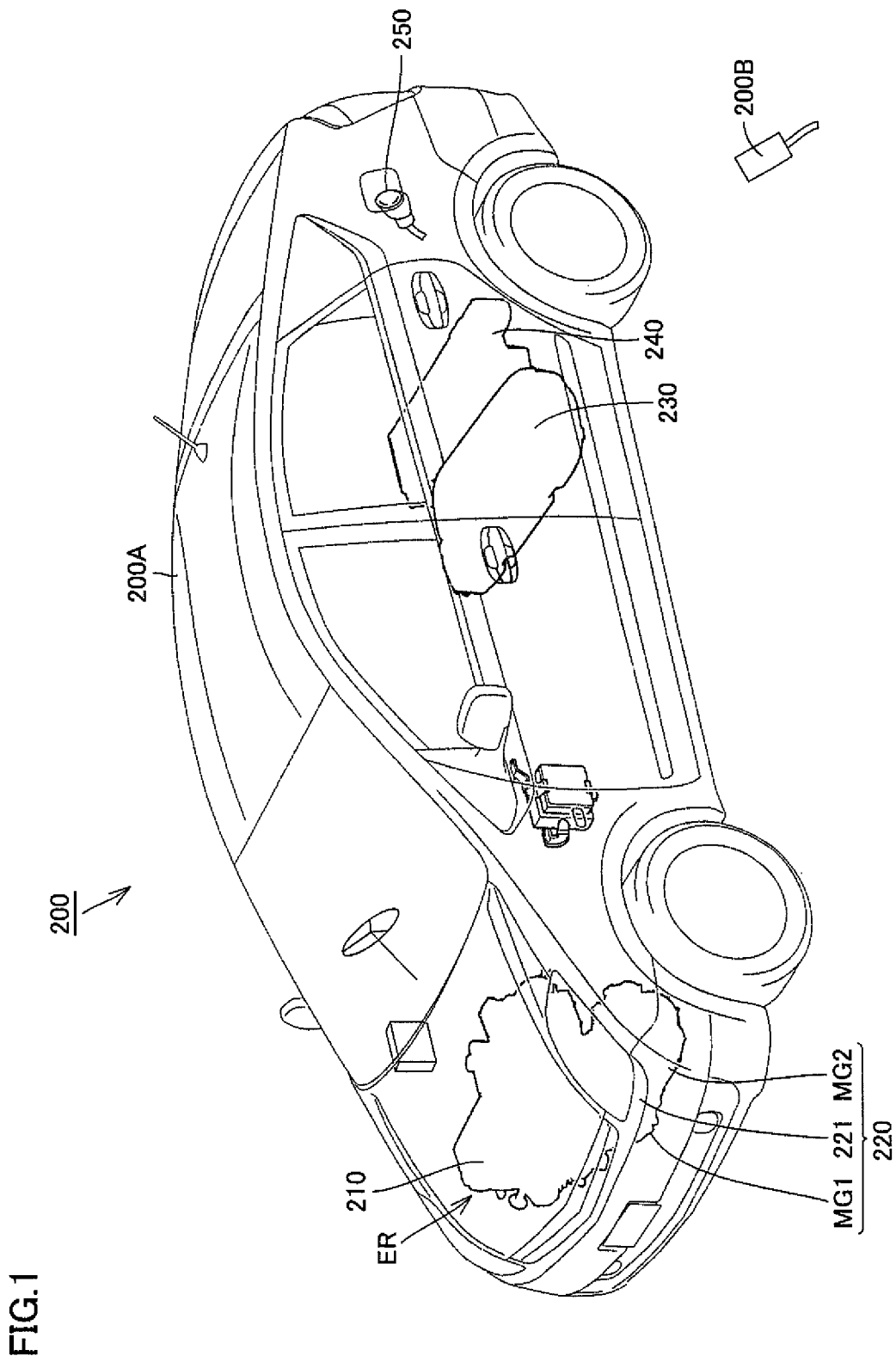
FIG. 1 is a perspective view when a hybrid car is viewed from one side surface.

An embodiment of this invention will be described with reference to the drawings. It is noted that, in the drawings referred to below, the same or corresponding members have the same numerals allotted.

Figure 2:
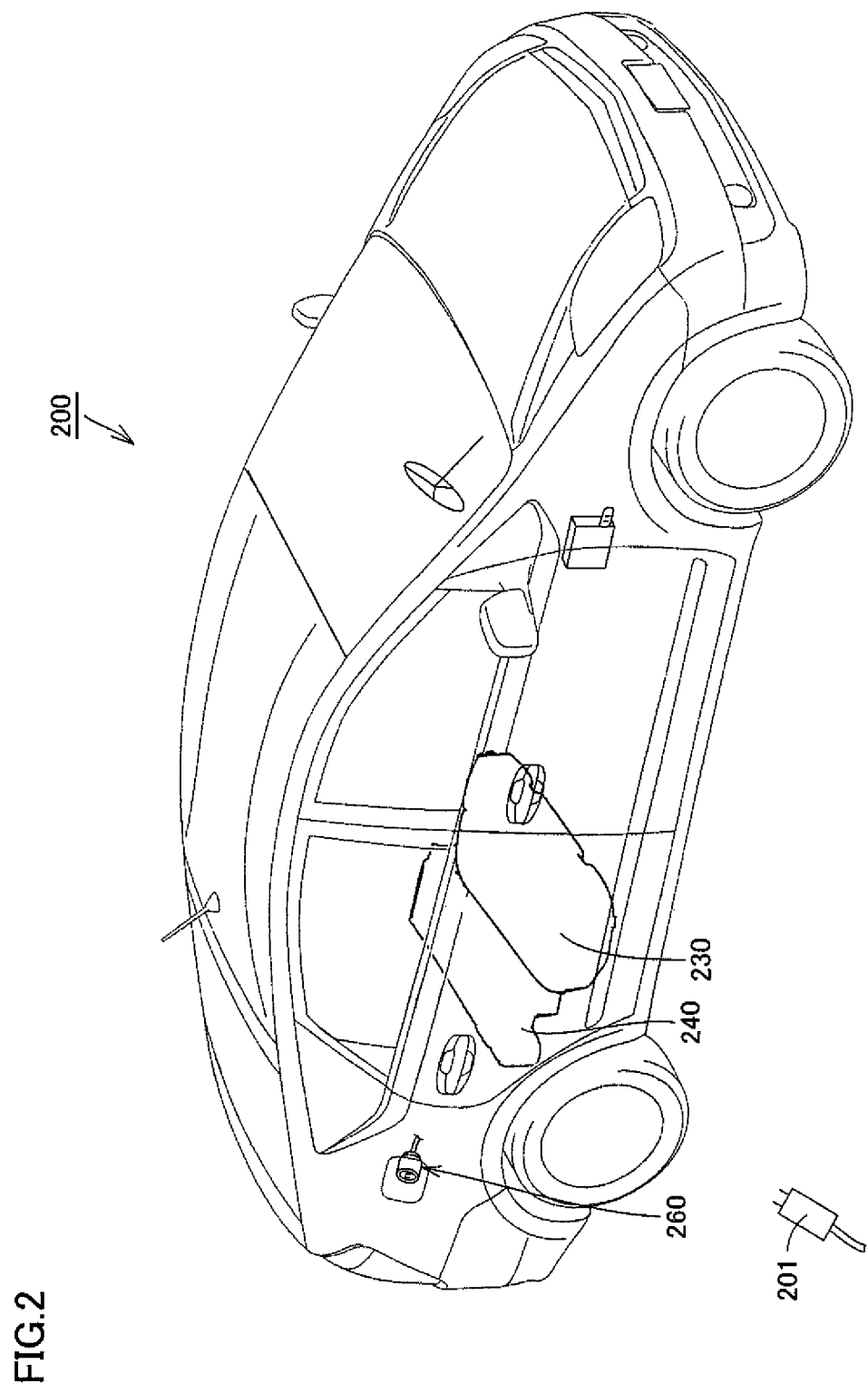
FIG. 2 is a perspective view when the hybrid car in FIG. 1 is viewed from the other side surface.

FIG. 1 is a perspective view when a hybrid car is viewed from one side surface. FIG. 2 is a perspective view when the hybrid car in FIG. 1 is viewed from the other side surface.

Referring to FIGS. 1 and 2, a hybrid car 200 is a vehicle having as motive power sources, an internal combustion engine 210 to which fuel is supplied and motor generators MG1, MG2 serving as motors to which electric power is supplied from a power storage device 240 that can be charged and discharge. Hybrid car 200 has a body 200A as an exterior of the vehicle, internal combustion engine 210, a transaxle 220, a fuel tank 230, power storage device 240, a fuel supply portion 250, and an electric power supply portion 260. Electric power supply portion 260 is provided as a power feed port to which a charge connector 201 which will be described later is connected.

Internal combustion engine 210 is contained in an engine compartment ER. Internal combustion engine 210 is represented by a gasoline engine or a diesel engine and it generates motive power for driving wheels as it is supplied with gasoline.

Transaxle 220 is contained in engine compartment ER, together with internal combustion engine 210. Transaxle 220 includes motor generators MG1, MG2 and a power split device 221.

Power split device 221 is coupled to internal combustion engine 210 and motor generators MG1, MG2 and distributes motive power there among. For example, a planetary gear mechanism having three rotation axes of a sun gear, a planetary carrier, and a ring gear is employed as power split device 221. These three rotation axes are connected to rotation axes of internal combustion engine 210 and motor generators MG1, MG2, respectively. For example, by forming a rotor of motor generator MG1 to be hollow and passing a crankshaft of internal combustion engine 210 into the center thereof, internal combustion engine 210 and motor generators MG1, MG2 can mechanically be connected to power split device 221.

A rotation shaft of motor generator MG2 is connected to a wheel with a reduction gear or a differential gear which is not shown being interposed. Power split device 221 may further incorporate a reduction gear for the rotation shaft of motor generator MG2.

Motor generator MG1 is incorporated in hybrid car 200 for operating as a generator driven by internal combustion engine 210 and operating as a motor capable of starting internal combustion engine 210. Motor generator MG2 is incorporated in hybrid car 200 as a motor for driving a wheel of hybrid car 200.

Motor generators MG1, MG2 are each implemented, for example, by a three-phase AC synchronous motor. Motor generators MG1, MG2 each have a three-phase coil constituted of a U-phase coil, a V-phase coil, and a W-phase coil as a stator coil. Motor generator MG1 generates a three-phase AC voltage by using output from internal combustion engine 210 and outputs the generated three-phase AC voltage to a not-shown inverter. Motor generator MG1 generates driving force with the three-phase AC voltage received from the inverter and starts internal combustion engine 210.

Motor generator MG2 generates drive torque for a vehicle with the three-phase AC voltage received from the inverter. Motor generator MG2 generates a three-phase AC voltage and outputs the voltage to the inverter during regenerative braking of the vehicle.

A not-shown inverter converts DC power stored in power storage device 240 to AC power and supplies the AC power to motor generators MG1, MG2. The inverter converts AC power supplied from motor generators MG1, MG2 to DC power and supplies the DC power to power storage device 240.

Fuel tank 230 is provided in a portion located under rear seats of a passenger compartment. Fuel tank 230 contains gasoline which is liquid fuel. Depending on a type of internal combustion engine 210, fuel tank 230 contains ethanol, propane gas which is gaseous fuel, or the like.

Power storage device 240 is provided in the portion located under the rear seats of the passenger compartment. For example, such a secondary battery as a nickel metal hydride battery, a lithium ion battery, and a lead acid battery can be employed as power storage device 240. Alternatively, an electric double layer capacitor of a large capacity can also be employed as power storage device 240.

Fuel supply portion 250 is provided in one side surface of body 200A. Fuel supply portion 250 is provided such that a fuel supply connector 200B can be connected thereto. As fuel supply connector 200B is connected to fuel supply portion 250, fuel is externally supplied to fuel tank 230. Electric power supply portion 260 is provided in the other side surface of body 200A. Electric power supply portion 260 is provided such that charge connector 201 can be connected thereto. As charge connector 201 is connected to electric power supply portion 260, electric power is externally supplied to power storage device 240.

Figure 3:
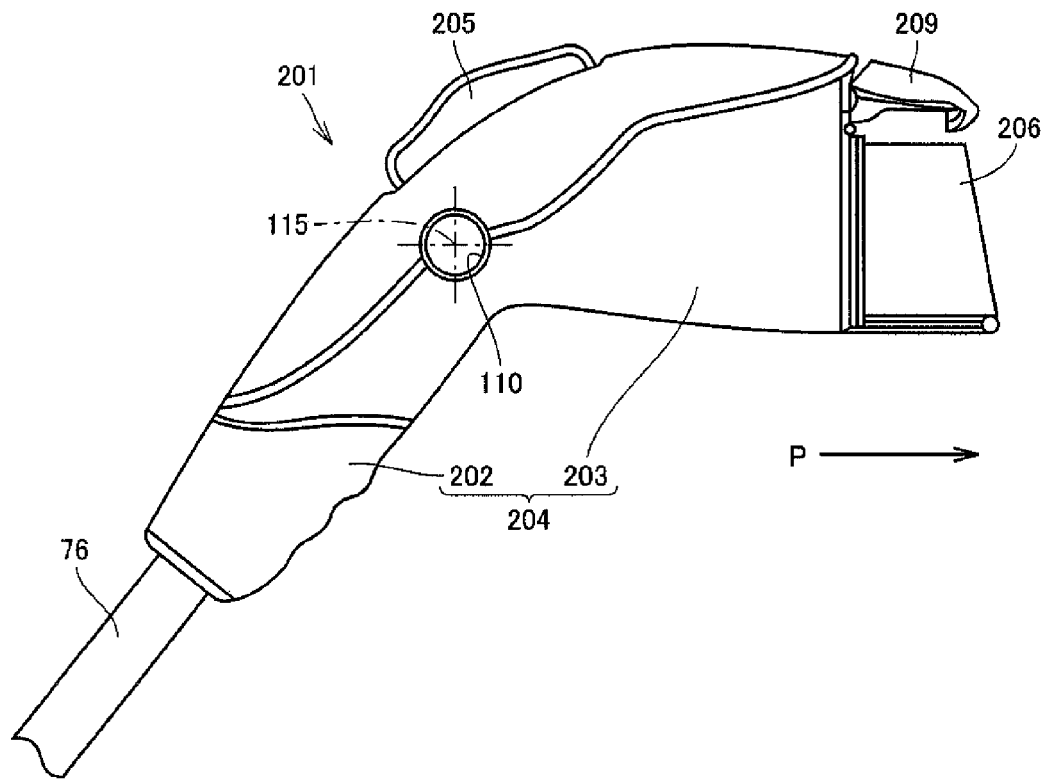
FIG. 3 is a side view showing a charge connector in FIG. 2.

FIG. 3 is a side view showing the charge connector in FIG. 2. A structure of charge connector 201 will be described with reference to FIG. 3. Charge connector 201 has a connection portion 206 and a main body portion 204.

Connection portion 206 has such a shape as connectable to electric power supply portion 260 in FIG. 2. Connection portion 206 is formed in a manner protruding from main body portion 204 in a direction shown with an arrow P. While power storage device 240 is charged, connection portion 206 is connected to electric power supply portion 260 as it is inserted in the direction shown with arrow P. Here, connection portion 206 plays a role as a terminal for electrically connecting electric power supply portion 260 and charge connector 201 to each other.

Main body portion 204 is formed from a cylindrical casing. Main body portion 204 has a grip portion 202 and an intermediate portion 203 as its constituent parts. Grip portion 202 is gripped by an operator who handles charge connector 201 during charging. Grip portion 202 has a thickness appropriate enough for an operator to easily grip. Intermediate portion 203 is provided to extend from grip portion 202 to connection portion 206. Intermediate portion 203 is bent from grip portion 202 and provided to extend from grip portion 202 to connection portion 206. Namely, main body portion 204 has a shape bent between grip portion 202 and intermediate portion 203. An angle formed between grip portion 202 and intermediate portion 203 is greater than 90° and smaller than 180°.

Charge connector 201 further has an engagement pawl 209 and an operation button 205. Engagement pawl 209 has such a pawl shape that can be engaged with electric power supply portion 260. Engagement pawl 209 is formed in a manner protruding from a position of intermediate portion 203 adjacent to connection portion 206 in the direction shown with arrow P. During charging, as engagement pawl 209 is engaged with electric power supply portion 260, charge connector 201 is fixed to electric power supply portion 260.

Operation button 205 is provided as an operation portion for coming out of such a state that charge connector 201 is fixed to electric power supply portion 260. Namely, operation button 205 is coupled to engagement pawl 209, and when operation button 205 is operated, engagement pawl 209 is displaced from a position where it is engaged with electric power supply portion 260. Operation button 205 is provided in a form protruding from main body portion 204. Operation button 205 is provided at a position where main body portion 204 is bent, opposite to a side where grip portion 202 and intermediate portion 203 form an angle greater than 90° and smaller than 180°.

Charge connector 201 has a support shaft insertion portion 110 serving as a support portion. Support shaft insertion portion 110 is formed in a form of a through hole having a central axis 115 as the center. Support shaft insertion portion 110 has a circular cross-section. Central axis 115 extends in a horizontal direction. Central axis 115 extends in parallel to central axes 101$p$ to 101$s$ and central axes 106$p$ to 106$s$ which will be described later. Support shaft insertion portion 110 is formed to pass through main body portion 204. When a plane where grip portion 202 and intermediate portion 203 are both arranged is assumed, support shaft insertion portion 110 is formed such that central axis 115 is orthogonal to that plane. Support shaft insertion portion 110 is arranged between grip portion 202 and intermediate portion 203.

A cable 76 is connected to charge connector 201. Cable 76 includes a power cable through which a current for charging a power storage device flows, a ground line, a signal line, and the like. Cable 76 is inserted from a rear end of charge connector 201, that is, an end portion of grip portion 202, it passes through main body portion 204, and it is provided to extend to connection portion 206.

Figure 4:
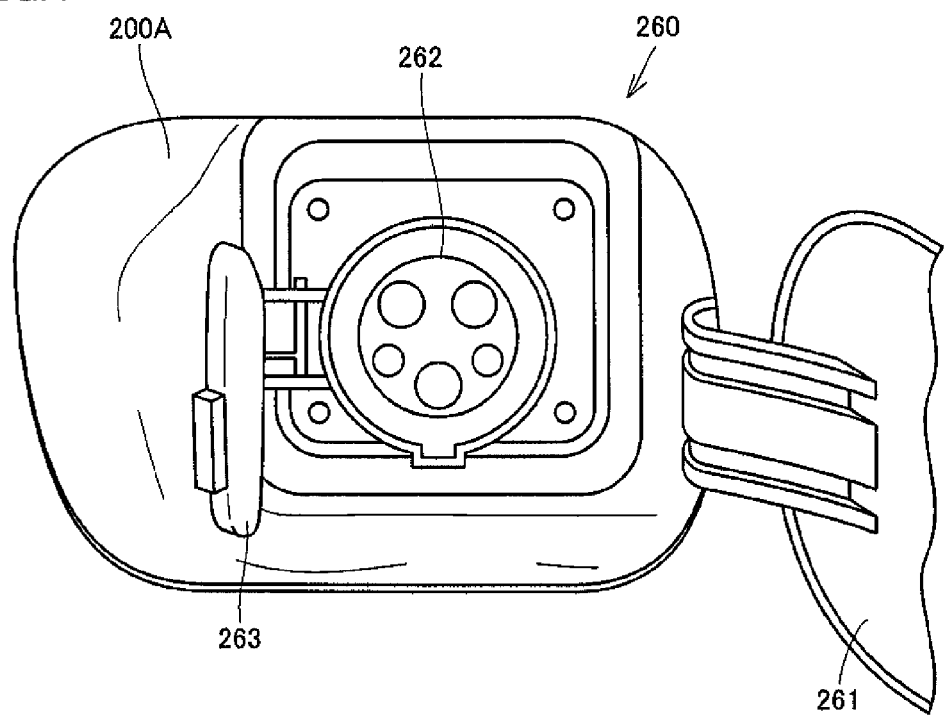
FIG. 4 is a front view showing an electric power supply portion in FIG. 2.

FIG. 4 is a front view showing the electric power supply portion in FIG. 2. Referring to FIG. 4, electric power supply portion 260 includes an outer lid 261, a head portion 262, and an inner lid 263. Outer lid 261 opens and closes an opening formed in a rear fender of body 200A. Head portion 262 is provided in body 200A. Inner lid 263 is provided to cover an end surface of head portion 262.

Head portion 262 is formed in a columnar shape. A plurality of holes receiving respective terminals provided in charge connector 201 are formed in an end surface of head portion 262. Connection portion 206 of charge connector 201 is formed in a hollow cylindrical shape in which terminals are arranged. Thus, connection portion 206 can receive head portion 262. As head portion 262 enters connection portion 206, each terminal of charge connector 201 enters the hole formed in head portion 262. Charging of a hybrid car through charge connector 201 is thus allowed.

Charge connector 201 is supported by a support arm in the present embodiment. The support arm is folded while it is not in use (during a period in which charging is not performed) and it is extended while it is in use (during a period in which charging is performed). Herein, the folded state during a period in which the support arm is not in use is referred to as an "accommodated state", while the extended state during a period in which the support arm is in use is referred to as a "used state". By thus constructing a support arm to be foldable when it is not in use, the support arm can be installed while making efficient use of a space.

Figure 5:
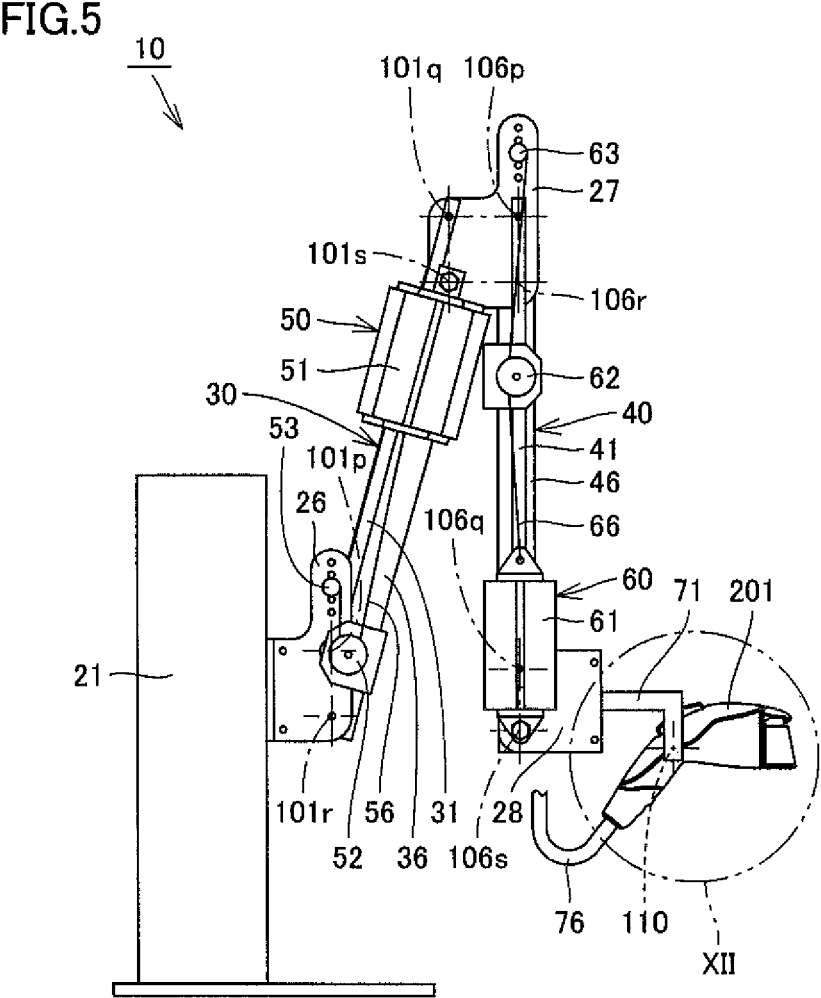
FIG. 5 is a side view showing an accommodated state of a support arm in a first embodiment of this invention.

FIG. 5 is a side view showing the accommodated state of the support arm in a first embodiment of this invention. FIG.

Figure 7:
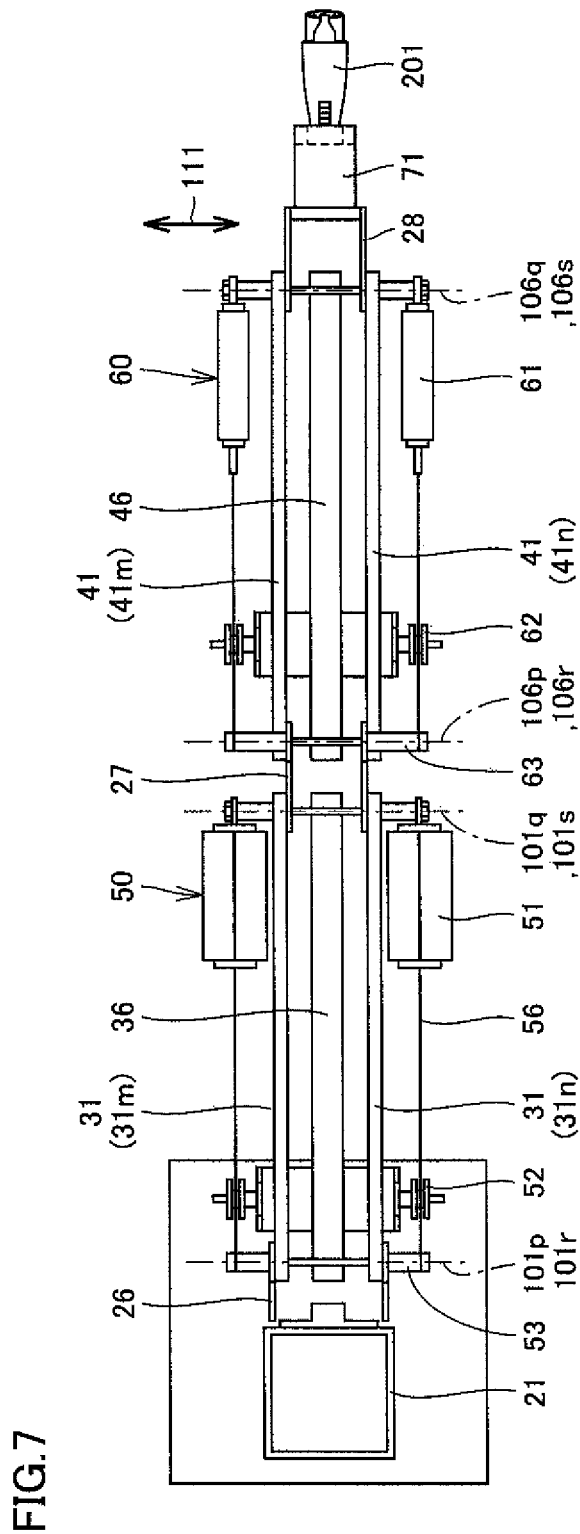
FIG. 7 is a top view showing the used state of the support arm in FIG. 5.

6 is a side view showing the used state of the support arm in FIG. 5. FIG. 7 is a top view showing the used state of the support arm in FIG. 5.

Figure 6:
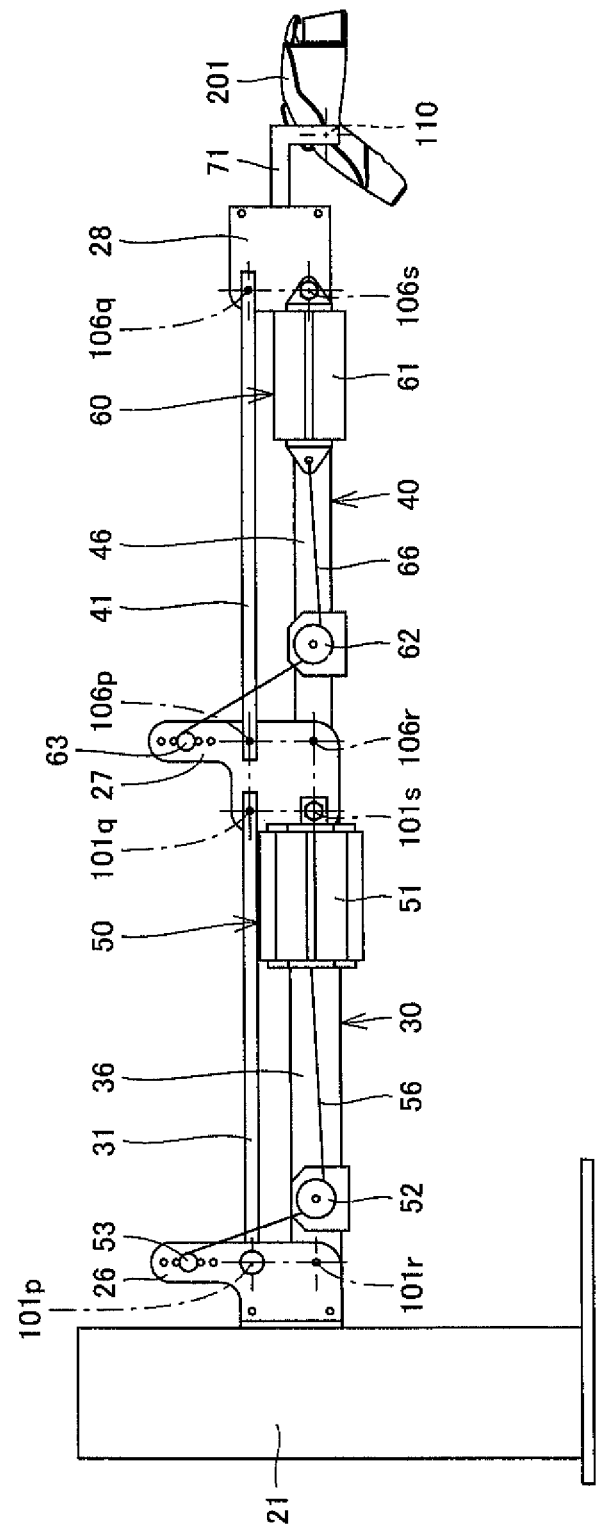
FIG. 6 is a side view showing a used state of the support arm in FIG. 5.

Referring to FIGS. 5 to 7, a support arm 10 in the present embodiment has a parallelogram linkage 40 serving as the first arm portion provided in a freely swingable manner and a parallelogram linkage 30 provided in a freely swingable manner and serving as a second arm portion coupled to parallelogram linkage 40. Parallelogram linkage 40 has a bracket 27, an upper shaft 41, a lower shaft 46, a bracket 28, and a hanger portion 71. Parallelogram linkage 30 has a bracket 26, an upper shaft 31, a lower shaft 36, and bracket 27. Parallelogram linkage 30 and parallelogram linkage 40 share bracket 27.

Bracket 26 is fixed to a post 21 installed at a charging station. Bracket 27 is provided at a distance from bracket 26. Bracket 27 is provided at a position of coupling between parallelogram linkage 30 and parallelogram linkage 40. Upper shaft 31 and lower shaft 36 are provided between bracket 26 and bracket 27. Upper shaft 31 and lower shaft 36 are pivotably coupled to bracket 27 and bracket 26 with the use of a not-shown bearing.

Bracket 28 is provided at a distance from bracket 27. Upper shaft 41 and lower shaft 46 are provided between bracket 27 and bracket 28. Upper shaft 41 and lower shaft 46 are pivotably coupled to bracket 27 and bracket 28 with the use of a not-shown bearing. Hanger portion 71 to which charge connector 201 in FIG. 2 is attached is connected to bracket 28. It is noted that a structure for support arm 10 to support charge connector 201 will be described in detail later.

Upper shaft 31 and lower shaft 36 are arranged in parallel at a distance from each other. In the used state of support arm 10 shown in FIG. 6, upper shaft 31 is positioned above lower shaft 36. In the present embodiment, an upper shaft 31$m$ and an upper shaft 31$n$ are provided as upper shaft 31.

One end of upper shaft 31 is coupled to bracket 26 so as to pivot around central axis 101$p$. The other end of upper shaft 31 is coupled to bracket 27 so as to pivot around central axis 101$q$. Upper shaft 31 is formed to linearly extend from central axis 101$p$ to central axis 101$q$. One end of lower shaft 36 is coupled to bracket 26 so as to pivot around central axis 101$r$. The other end of lower shaft 36 is coupled to bracket 27 so as to pivot around central axis 101$s$. Lower shaft 36 is formed to linearly extend from central axis 101$r$ to central axis 101$s$.

Central axis 101$p$, central axis 101$q$, central axis 101$r$, and central axis 101$s$ extend in parallel to one another. Central axis 101$p$ and central axis 101$r$ are arranged on the same straight line extending in a vertical direction. Central axis 101$q$ and central axis 101$s$ are arranged on the same straight line extending in a vertical direction. A distance between central axis 101$p$ and central axis 101$q$ is equal to a distance between central axis 101$r$ and central axis 101$s$.

In support arm 10 in the present embodiment, upper shaft 31 and lower shaft 36 are arranged in a manner displaced from each other in a direction of axis around which each shaft pivots, that is, in an axial direction of central axes 101$p$ to 101$r$ (a direction shown with an arrow 111 in FIG. 7).

More specifically, upper shaft 31$m$ and upper shaft 31$n$ are arranged on opposing sides of lower shaft 36 in the axial direction of central axes 101$p$ to 101$r$. Upper shaft 31$m$ and upper shaft 31$n$ are arranged symmetrically on both sides of lower shaft 36. Namely, a distance between lower shaft 36 and upper shaft 31$m$ in the axial direction of central axes 101$p$ to 101$r$ is equal to a distance between lower shaft 36 and upper shaft 31$n$ in the axial direction of central axes 101$p$ to 101$r$.

Upper shaft 41 and lower shaft 46 are arranged in parallel at a distance from each other. In the used state of support arm 10 shown in FIG. 6, upper shaft 41 is positioned above lower shaft 46. In the present embodiment, an upper shaft 41$m$ and an upper shaft 41$n$ are provided as upper shaft 41.

One end of upper shaft 41 is coupled to bracket 27 so as to pivot around central axis 106$p$. The other end of upper shaft 41 is coupled to bracket 28 so as to pivot around central axis 106$q$. Upper shaft 41 is formed to linearly extend from central axis 106$p$ to central axis 106$q$. One end of lower shaft 46 is coupled to bracket 27 so as to pivot around central axis 106$r$. The other end of lower shaft 46 is coupled to bracket 28 so as to pivot around central axis 106$s$. Lower shaft 46 is formed to linearly extend from central axis 106$r$ to central axis 106$s$.

Central axis 106$p$, central axis 106$q$, central axis 106$r$, and central axis 106$s$ extend in parallel to one another. Central axis 106$p$ and central axis 106$r$ are arranged on the same straight line extending in a vertical direction. Central axis 106$q$ and central axis 106$s$ are arranged on the same straight line extending in a vertical direction. A distance between central axis 106$p$ and central axis 106$q$ is equal to a distance between central axis 106$r$ and central axis 106$s$.

Central axes 101$p$ to 101$s$ and central axes 106$p$ to 106$s$ extend in parallel to one another. In the used state shown in FIG. 6, central axis 101$p$, central axis 101$q$, central axis 106$p$, and central axis 106$q$ are arranged on the same line extending in a horizontal direction. In the used state shown in FIG. 6, central axis 101$r$, central axis 101$s$, central axis 106$r$, and central axis 106$s$ are arranged on the same line extending in a horizontal direction.

In support arm 10 in the present embodiment, upper shaft 41 and lower shaft 46 are arranged in a manner displaced from each other in a direction of axis around which each shaft pivots, that is, in an axial direction of central axes 106$p$ to 106$r$ (the direction shown with arrow 111 in FIG. 7). Specific arrangement of upper shaft 41 and lower shaft 46 is the same as arrangement of upper shaft 31 and lower shaft 36 described above.

Support arm 10 in the present embodiment further has a gravity compensation apparatus 50 and a gravity compensation apparatus 60. Gravity compensation apparatus 50 generates force canceling gravity acting on parallelogram linkage 30 and parallelogram linkage 40, and gravity compensation apparatus 60 generates force canceling gravity acting on parallelogram linkage 40.

Gravity compensation apparatus 50 has a spring portion 51, a pulley 52, a pin 53, and a wire 56. Spring portion 51 is supported by bracket 27 and pulley 52 is supported by lower shaft 36. When viewed in the axial direction of central axes 101$p$ to 101$s$, spring portion 51 is provided at a position adjacent to bracket 27. Spring portion 51 is constituted of a plurality of springs coupled in parallel. Pulley 52 is rotatably supported at a position adjacent to bracket 26. Pin 53 is fixed to bracket 26. Pin 53 is arranged opposite to central axis 101$r$, with respect to central axis 101$p$. Pin 53 is arranged on a line connecting central axis 101$p$ and central axis 101$r$ to each other. Wire 56 is wound around spring portion 51 and pin 53. Wire 56 drawn out of spring portion 51 extends in a direction toward bracket 26. In addition, wire 56 changes its direction as it is wound around pulley 52 and extends toward pin 53.

Gravity compensation apparatus 60 has a spring portion 61, a pulley 62, a pin 63, and a wire 66. Spring portion 61 is supported by bracket 28 and pulley 62 is supported by lower shaft 46. When viewed from the axial direction around which parallelogram linkage 40 pivots, spring portion 61 is provided at a position adjacent to bracket 28. Spring portion 61 is constituted of a plurality of springs coupled in parallel. Since gravity compensation apparatus 50 generates force canceling gravity acting not only on parallelogram linkage 30 but also on parallelogram linkage 40, spring portion 51 is constituted of springs greater in number than spring portion 61. Pulley 62 is rotatably supported at a position adjacent to bracket 27. Pin 63 infixed to bracket 27. Pin 63 is arranged opposite to central axis 106r, with respect to central axis 106p. Pin 63 is arranged on a line connecting central axis 106p and central axis 106r to each other. Wire 66 is wound around spring portion 61 and pin 63. Wire 66 drawn out of spring portion 61 extends in a direction toward bracket 27. In addition, wire 66 changes its direction as it is wound around pulley 62 and extends toward pin 63.

When transition from the used state shown in FIG. 6 to the accommodated state shown in FIG. 5 is made, against gravity acting on parallelogram linkage 30 and parallelogram linkage 40, the center of gravity of parallelogram linkage 30 and parallelogram linkage 40 should be moved upward. In support arm 10 in the present embodiment, by providing gravity compensation apparatuses 50, 60 for canceling such gravity by making use of spring force, transition from the used state to the accommodated state of support arm 10 can be made with smaller force.

Figure 8:
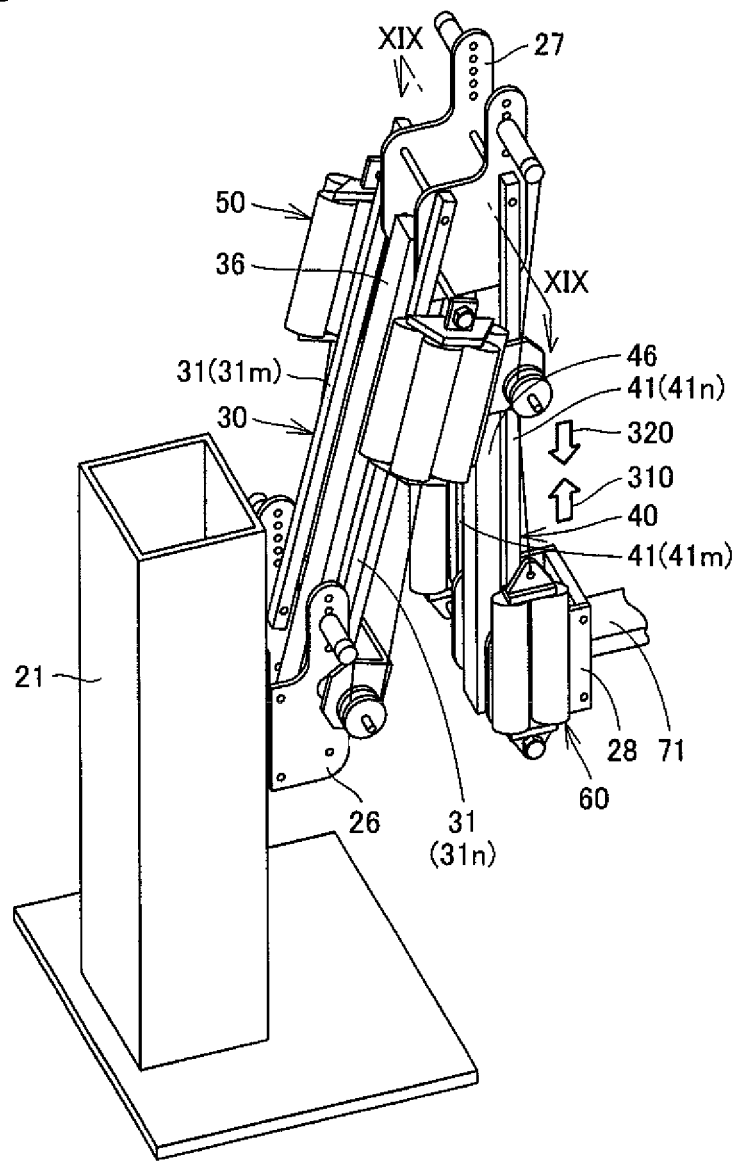
FIG. 8 is a perspective view showing the accommodated state of the support arm.
Figure 9:
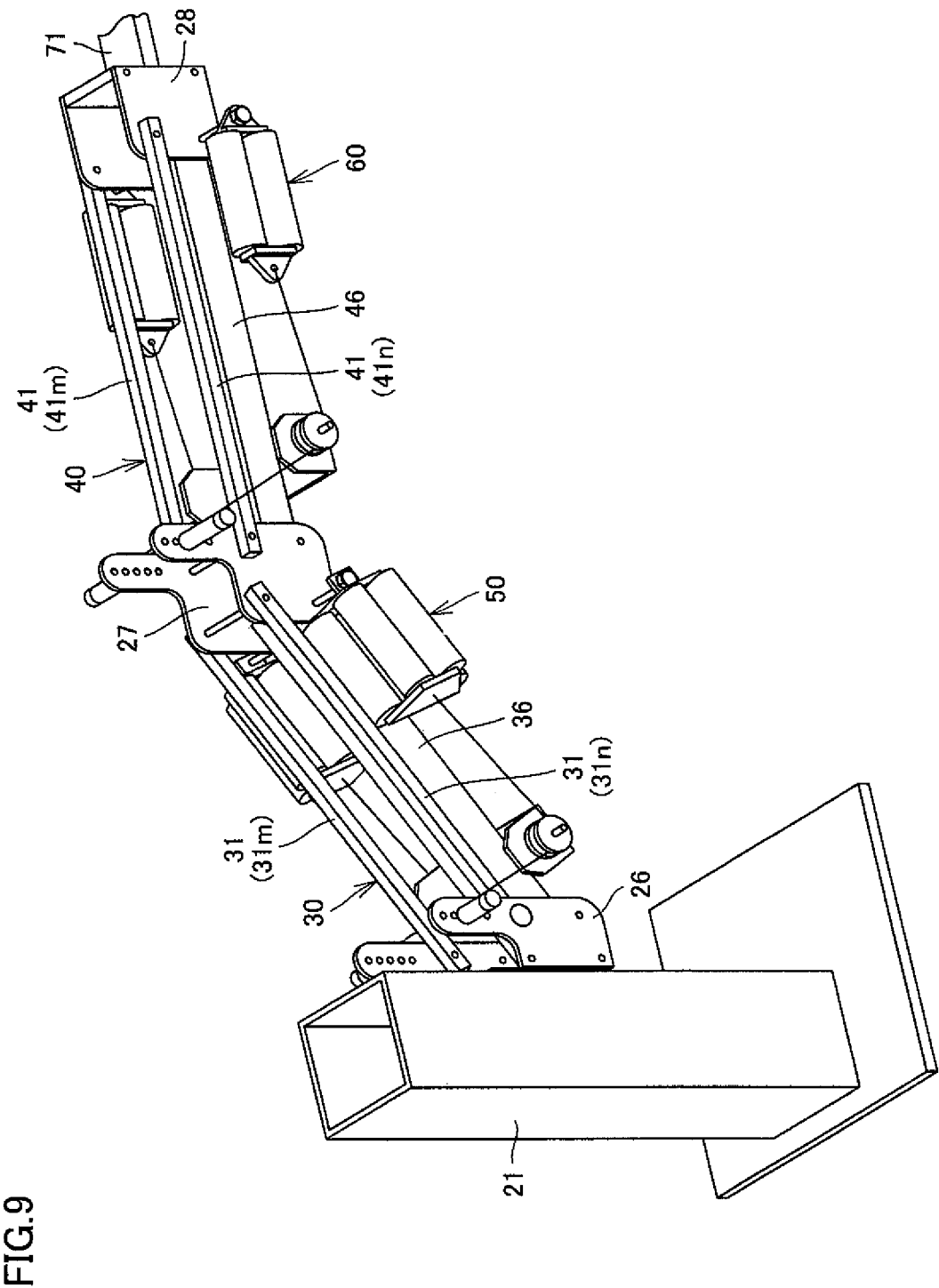
FIG. 9 is a perspective view showing a state intermediate between the accommodated state and the used state of the support arm.
Figure 10:
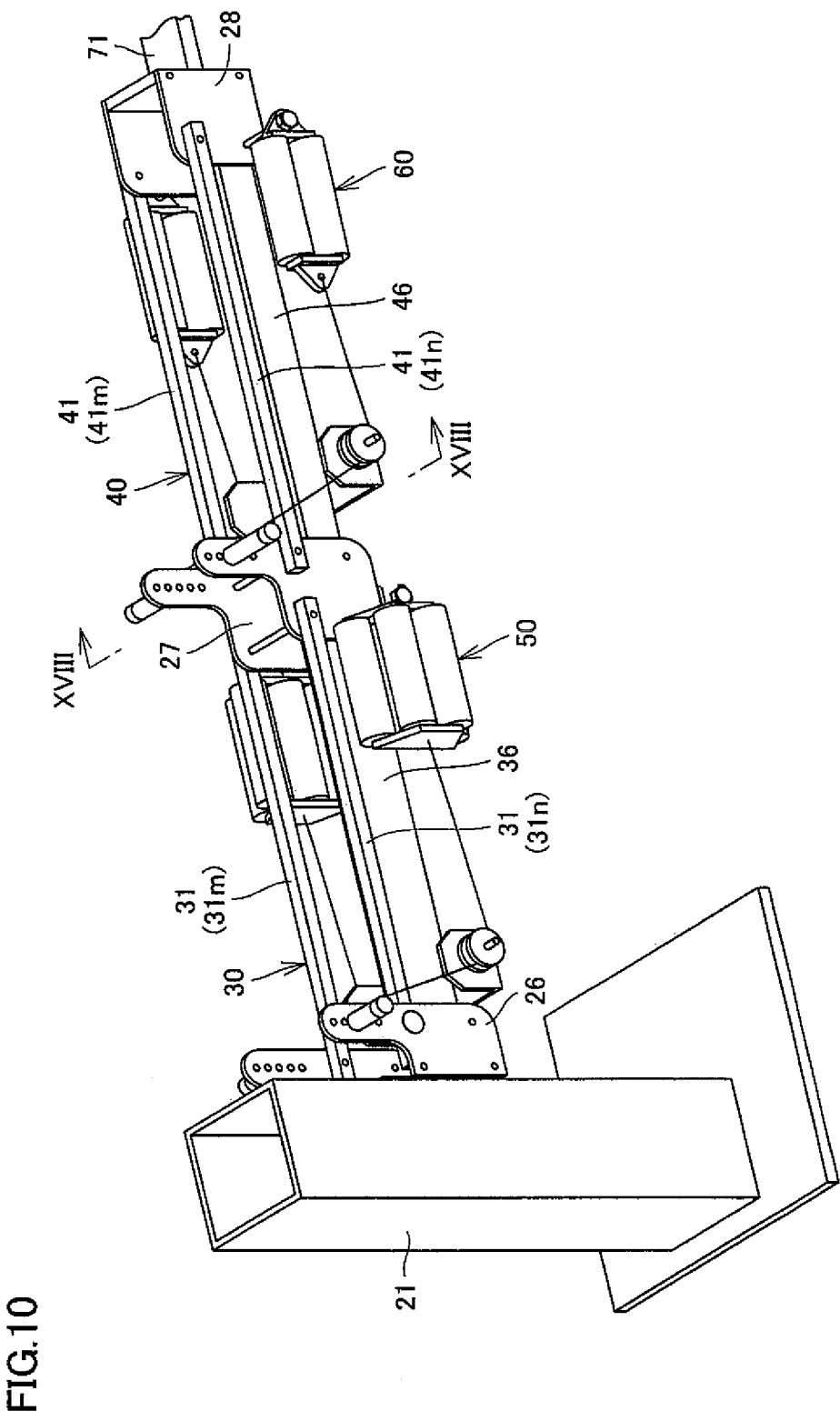
FIG. 10 is a perspective view showing the used state of the support arm.
Figure 11:
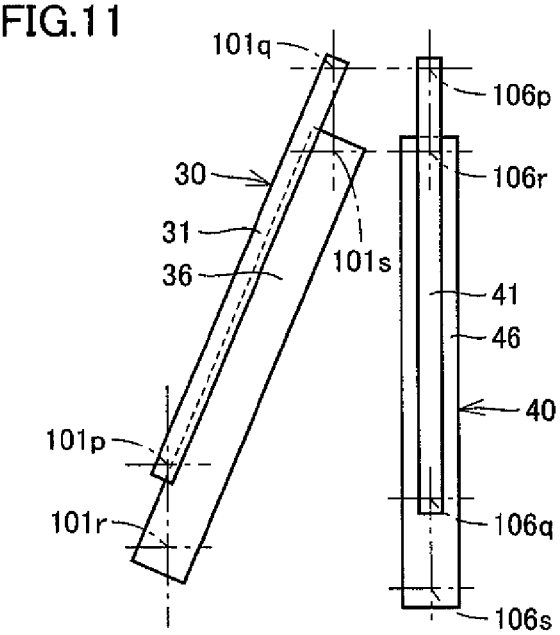
FIG. 11 is a side view showing a form of an upper arm and a lower arm while the support arm is accommodated.

FIG. 8 is a perspective view showing the accommodated state of the support arm. FIG. 9 is a perspective view showing a state intermediate between the accommodated state and the used state of the support arm. FIG. 10 is a perspective view showing the used state of the support arm. FIG. 11 is a side view showing a form of an upper arm and a lower arm while the support arm is accommodated.

Referring to FIGS. 8 to 11, in the accommodated state shown in FIG. 8, parallelogram linkage 30 is positioned to stand upward from bracket 26 and parallelogram linkage 40 is in a form folded with respect to parallelogram linkage 40 with bracket 27 serving as the fulcrum. In particular in support arm 10 in the present embodiment, parallelogram linkage 30 is positioned to extend from bracket 26 diagonally with respect to a vertically upward direction, and parallelogram linkage 40 is positioned to extend from bracket 26 in a vertically downward direction. On the other hand, in the used state shown in FIG. 10, parallelogram linkage 30 is positioned to extend from bracket 26 in a horizontal direction, and further parallelogram linkage 40 is positioned to extend from bracket 27 in the horizontal direction.

As support arm 10 operates between the accommodated state and the used state, inclination of parallelogram linkage 30 and parallelogram linkage 40 varies. Here, in parallelogram linkage 30, a distance between upper shaft 31 and lower shaft 36 when viewed in the axial direction of central axes 101p to 101s varies while upper shaft 31 and lower shaft 36 keep parallel arrangement. Specifically, in the used state, a distance between upper shaft 31 and lower shaft 36 increases, while in the accommodated state, a distance between upper shaft 31 and lower shaft 36 decreases. In parallelogram linkage 40, a distance between upper shaft 41 and lower shaft 46 when viewed in the axial direction of central axes 106p to 106s varies while upper shaft 41 and lower shaft 46 keep parallel arrangement. Specifically, in the used state, a distance between upper shaft 41 and lower shaft 46 increases, while in the accommodated state, a distance between upper shaft 41 and lower shaft 46 decreases.

In support arm 10 in the present embodiment, as described above, upper shaft 31 and lower shaft 36 are arranged in a manner displaced from each other in the axial direction of central axes 101p to 101s, and upper shaft 41 and lower shaft 46 are arranged in a manner displaced from each other in the axial direction of central axes 106p to 106s. According to such a construction, in particular as shown in Fig, 11, in the accommodated state of support arm 10, such a form that upper shaft 31 lies over lower shaft 36 when viewed in the axial direction of central axes 101p to 101s and upper shaft 41 lies over lower shaft 46 when viewed in the axial direction of central axes 106p to 106s can be taken. Thus, a width of folded upper shaft 31 and lower shaft 36 in a horizontal direction is made smaller and a compact accommodated state can be obtained.

Figure 12:
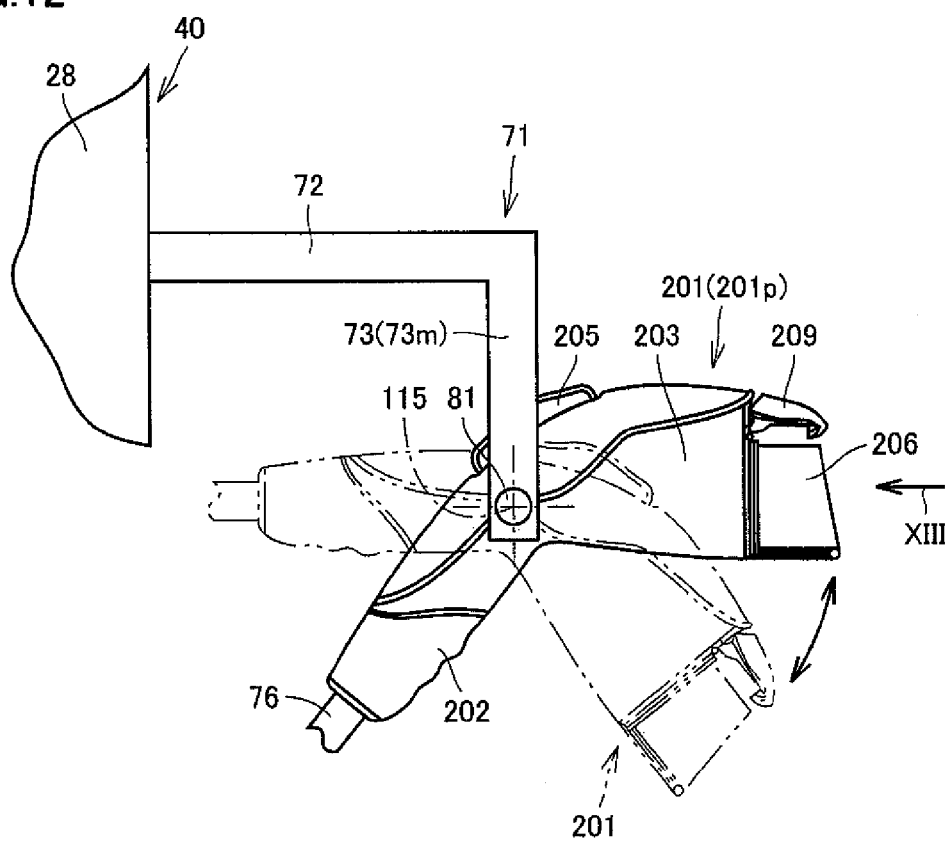
FIG. 12 is a side view showing the support arm in a region surrounded by a chain double dotted line XII in FIG. 5.
Figure 13:
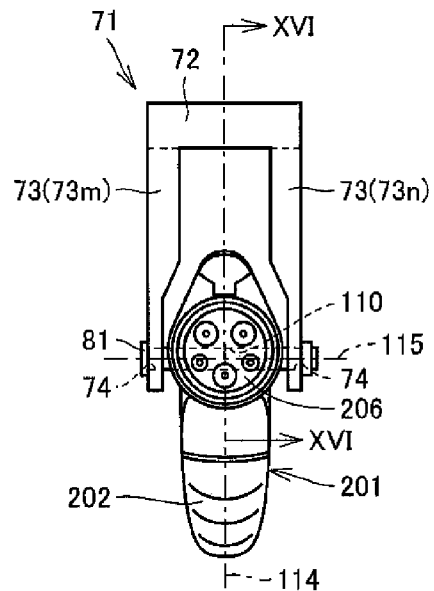
FIG. 13 is a front view showing the support arm when viewed in a direction shown with an arrow XIII in FIG. 12.

In succession, a structure for support arm 10 to support charge connector 201 will be described. FIG. 12 is a side view showing the support arm in a region surrounded by a chain double dotted line XII in FIG. 5. FIG. 13 is a front view showing the support arm when viewed in a direction shown with an arrow XIII in FIG. 12.

Referring to FIGS. 12 and 13, during charging of a hybrid car, an operator connects charge connector 201 to electric power supply portion 260 (see FIG. 2) of the hybrid car while swinging parallelogram linkage 30 and parallelogram linkage 40. Here, since a structure of electric power supply portion 260 is different depending on a type of a car, a freely variable position of charge connector 201 is more convenient. Therefore, in support arm 10 in the present embodiment, charge connector 201 is supported by parallelogram linkage 40 in a state rotatable around central axis 115.

More specifically, charge connector 201 is rotatably attached to hanger portion 71. Hanger portion 71 has a base 72 and a prong portion 73m and a prong portion 73n (hereinafter referred to as a prong portion 73 unless particularly distinguished) as its constituent parts. Base 72 is formed to extend from bracket 28 in a direction away from post 21 in FIG. 5. Prong portion 73 is formed to extend from base 72 in a vertically downward direction. Prong portion 73m and prong portion 73n are provided at a distance from each other. A through hole 74 is formed in prong portion 73m and prong portion 73n. Through hole 74 extends in a horizontal direction.

While charge connector 201 is positioned between prong portion 73m and prong portion 73n, a support shaft 81 is inserted in through hole 74 and support shaft insertion portion 110 extending along central axis 115. Charge connector 201 is suspended from above by hanger portion 71.

It is noted that a movable range of charge connector 21 provided rotatably with respect to parallelogram linkage 40 may be not smaller than 360° or smaller than 360°. A movable range of charge connector 21 may be smaller than 180° or smaller than 90°.

Referring to FIG. 3, in support arm 10 in the present embodiment, support shaft insertion portion 110 is arranged at the position of the center of gravity of charge connector 201. Namely, charge connector 201 is provided to be rotatable around the position of the center of gravity of charge connector 201.

Figure 14:
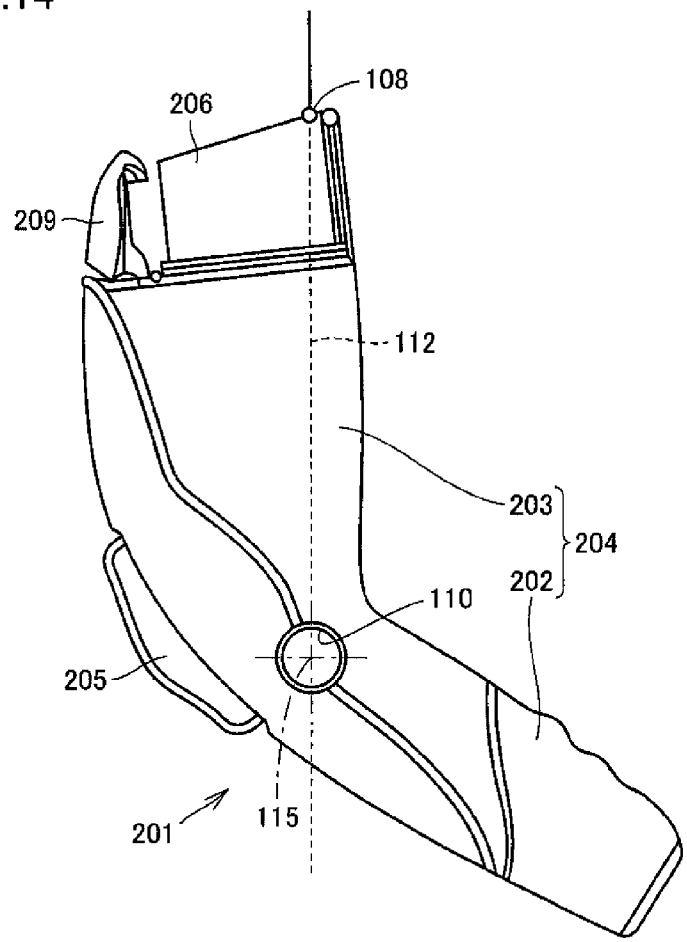
FIG. 14 is a side view showing a method of specifying a position of the center of gravity of a charge connector.
Figure 15:
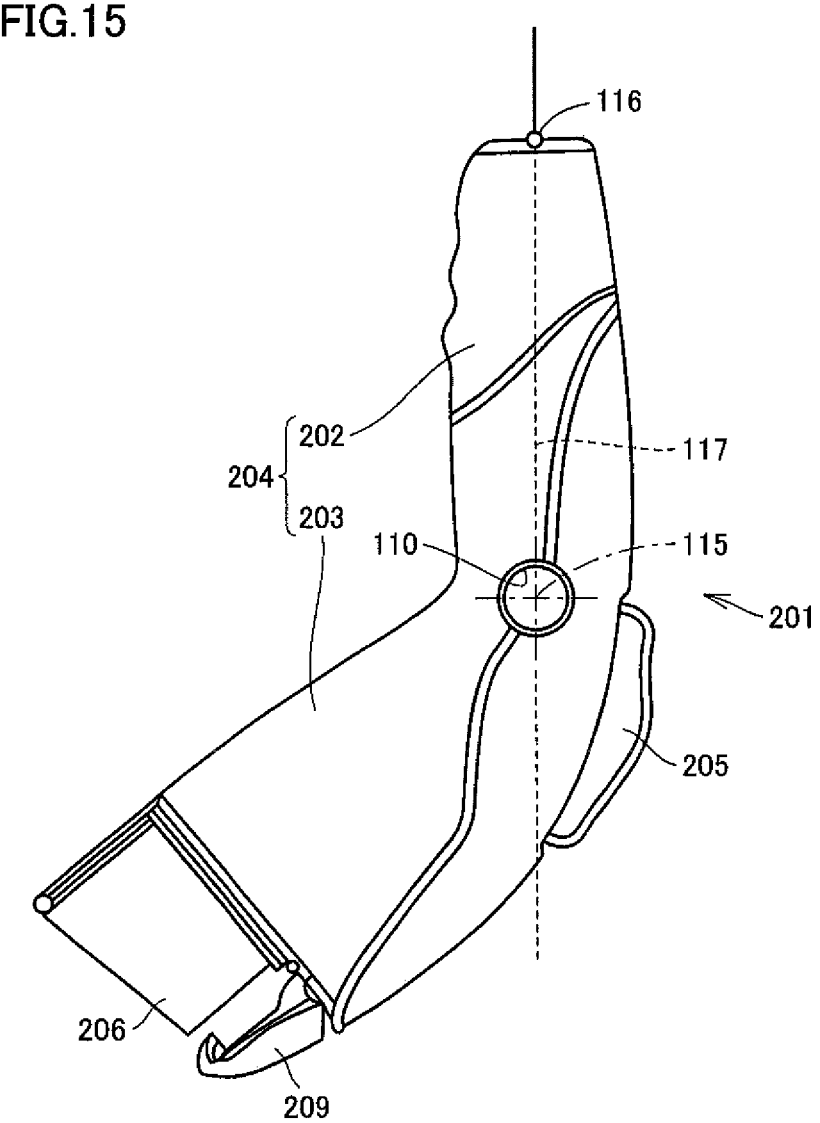
FIG. 15 is another side view showing the method of specifying the position of the center of gravity of the charge connector.

FIGS. 14 and 15 are side views showing a method of specifying a position of the center of gravity of the charge connector. Referring to FIGS. 14 and 15, the position of the center of gravity of charge connector 201 is specified, for example, with the following method. Initially, charge connector 201 disconnected from cable 76 is prepared. A hang-down position 108 and a hang-down position 116 are set at two appropriate portions on an outer surface of charge connector 201. As shown in FIG. 13, charge connector 201 has a structure symmetrical with respect to a plane 114 and hang-down position 108 and hang-down position 116 are set on that plane 114.

A thread is tied to hang-down position 108 and charge connector 201 is hung down from the thread. Here, an extension line 112 extending from the thread in a vertically downward direction is specified. Then, a thread is tied to hang-down position 116 and charge connector 201 is hung down from the thread. Here, an extension line 117 extending from the thread in a vertically downward direction is specified. A position where extension line 112 and extension line 117 intersect with each other is the position of the center of gravity of charge connector 201, and support shaft insertion portion 110 is provided to lie on that position.

It is noted that the method of specifying a position of the center of gravity of charge connector 201 is not limited to such a method, and a position of the center of gravity may be specified, for example, by inputting a shape, a material, and the like of charge connector 201 into a computer and causing the computer to perform operation.

In succession, a function and effect achieved by support arm 10 in the present embodiment will be described.

Referring to FIG. 8, in the figure, gravity acting on parallelogram linkage 40 is shown with an arrow 320, and tensile force in a vertical direction generated by spring portion 61 owing to the gravity compensation function of gravity compensation apparatus 60 is shown with an arrow 310. As gravity acting on parallelogram linkage 40 and tensile force in the vertical direction generated by spring portion 61 are balanced, parallelogram linkage 40 rests.

Referring to FIGS. 8 and 12, on the other hand, as charge connector 201 is rotated around central axis 115, a position of charge connector 201 varies. Here, as moment applied from charge connector 201 to parallelogram linkage 40 varies, balance between gravity acting on parallelogram linkage 40 and tensile force in the vertical direction generated by spring portion 61 is lost and parallelogram linkage 40 may unintentionally be actuated.

In contrast, in support arm 10 in the present embodiment, support shaft insertion portion 110 is arranged at the position of the center of gravity of charge connector 201. According to such a construction, regardless of a position of charge connector 201, moment applied from charge connector 201 to parallelogram linkage 40 is constant and hence parallelogram linkage 40 can be prevented from unintentionally being actuated.

In particular in the present embodiment, since a bearing is used for coupling between upper shaft 41 and lower shaft 46 constituting parallelogram linkage 40, force preventing actuation of parallelogram linkage 40 such as friction force is very small. Therefore, when balance between gravity acting on parallelogram linkage 40 and tensile force by spring portion 61 is lost, disadvantageously, parallelogram linkage 40 readily starts to be actuated, and the present invention is more effectively applied to such a support arm 10.

Though the description above has been given only in connection with parallelogram linkage 40, the same effect is achieved also with parallelogram linkage 30.

Summarizing the structure of the support arm in the first embodiment of this invention described above, support arm 10 in the present embodiment is the support arm for supporting charge connector 201 which can be connected to a vehicle. Support arm 10 includes parallelogram linkage 40 serving as the first arm portion in a freely swingable manner, gravity compensation apparatus 60 for generating force canceling gravity acting on parallelogram linkage 40, and charge connector 201 having support shaft insertion portion 110 serving as the support portion supported by parallelogram linkage 40 and provided to be rotatable around support shaft insertion portion 110. Support shaft insertion portion 110 is arranged at the position of the center of gravity of charge connector 201.

According to support arm 10 in the first embodiment of this invention thus constructed, regardless of a position of charge connector 201, a gravity compensation function of gravity compensation apparatuses 50, 60 can appropriately be exhibited. Thus, support arm 10 having excellent usability and improved operability during charging can be realized.

Though a case where the present invention is applied to support arm 10 including two parallelogram linkages as combined has been described in the present embodiment, the embodiment is not limited thereto, and for example, parallelogram linkage 40 in FIG. 5 may directly be fixed to post 21.

(Second Embodiment)

Figure 16:
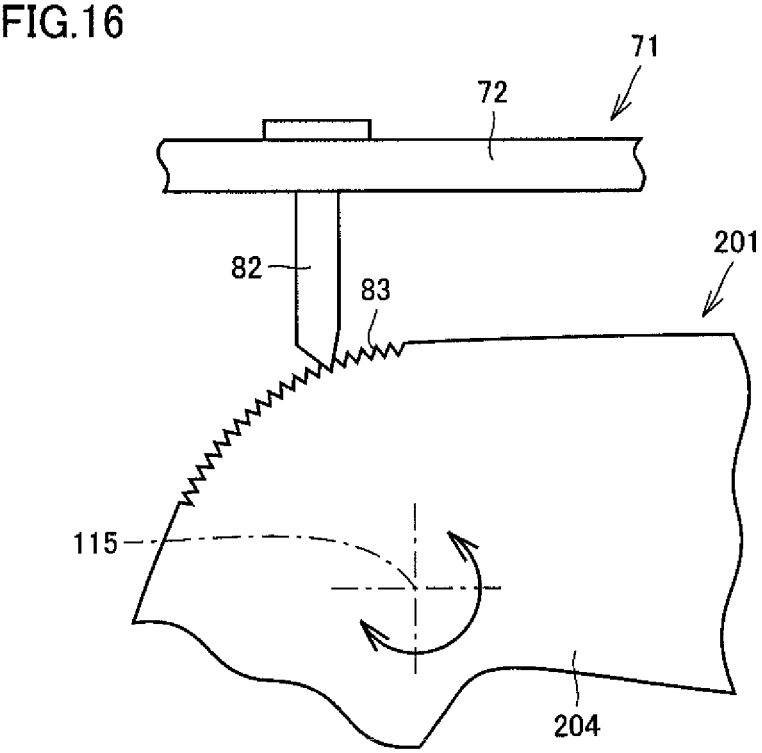
FIG. 16 is a side view showing a support arm in a second embodiment of this invention.

FIG. 16 is a side view showing a support arm in a second embodiment of this invention. The figure shows a shape of a support arm corresponding to a position along the line XVI-XVI in FIG. 13.

Referring to FIG. 16, the support arm in the present embodiment further includes a locking mechanism for holding charge connector 201 in a constant position, in addition to the structure included in support arm 10 in the first embodiment. More specifically, the support arm in the present embodiment further has a lock pin 82 and an engagement groove 83 serving as the locking mechanism.

Engagement groove 83 is formed in main body portion 204 of charge connector 201. Engagement groove 83 is formed such that a plurality of groove shapes are aligned in a circumferential direction of central axis 115. Engagement groove 83 is formed at a position opposed to base 72 of hanger portion 71. Lock pin 82 is supported by base 72 and it extends toward main body portion 204. Lock pin 82 is provided to slidably move in a direction of its axis extending toward main body portion 204.

As lock pin 82 is slid toward main body portion 204, lock pin 82 fits into any of the plurality of groove shapes forming engagement groove 83. Here, rotational motion of charge connector 201 is locked so that charge connector 201 is held in an appropriate position. On the other hand, by sliding lock pin 82 in a direction of pull-out from engagement groove 83, charge connector 201 is unlocked.

According to such a construction, by fixing the position of charge connector 201 during charging, a charging operation can be performed in a stable position. In addition, in the case where the same vehicle is continually charged, operation efficiency during charging can be improved by holding a position (an angle) of charge connector 201 with respect to electric power supply portion 260 (see FIG. 2) to be constant.

According to the support arm in the second embodiment of this invention thus constructed, the effect described in the first embodiment can similarly be obtained. In addition, operability during charging can further be improved.

(Third Embodiment)

Figure 17:
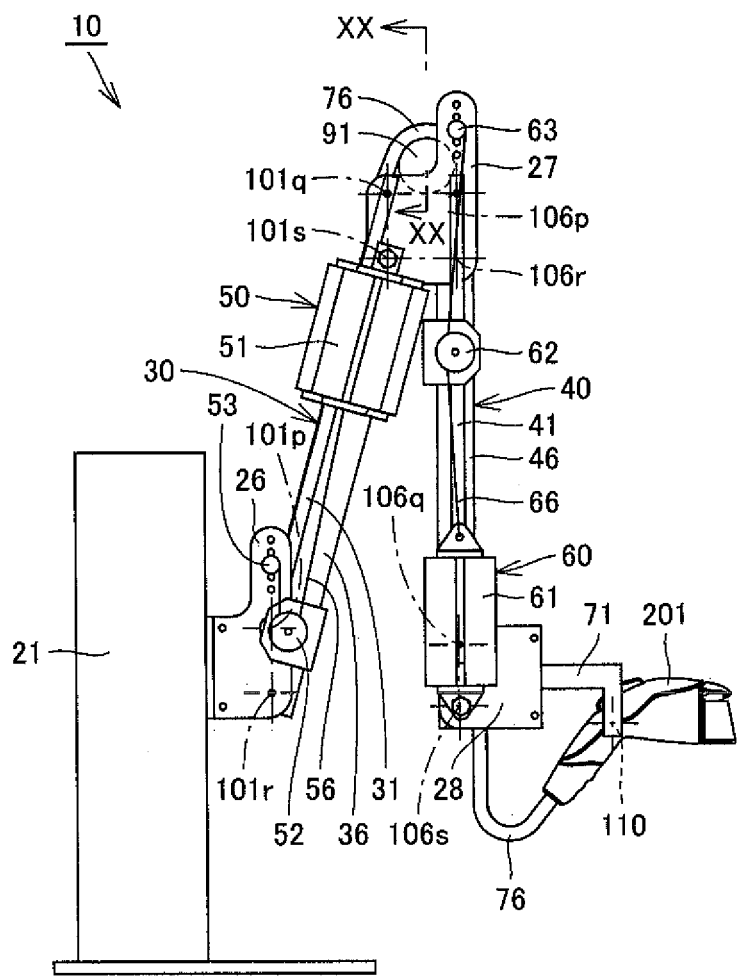
FIG. 17 is a side view showing a support arm in a third embodiment of this invention.

FIG. 17 is a side view showing a support arm in a third embodiment of this invention. FIG. 17 is a diagram corresponding to FIG. 5 in the first embodiment.

Referring to FIG. 17, the support arm in the present embodiment further includes a characteristic structure associated with cable 76 extending from charge connector 201, in addition to the structure included in support arm 10 in the first embodiment. Cable 76 extending from charge connector 201 is routed along parallelogram linkage 40 and parallelogram linkage 30 and it reaches post 21.

Referring to FIGS. 12 and 13, as shown with a charge connector 201p in the figures, charge connector 201 is held in such a position that cable 76 is hung downward from charge connector 201 while external force is not applied, that is, an operator does not touch charge connector 201. On the other hand, charge connector 201 is suspended from above by hanger portion 71. According to such a construction, since cable 76 extends from charge connector 201 in a direction opposite to hanger portion 71, entanglement of cable 76 with charge connector 201 can be suppressed.

In addition, while external force is not applied to charge connector 201, grip portion 202 is arranged below hanger portion 71. According to such a construction, when an operator initially accesses charge connector 201, the operator can readily grip grip portion 202 without being blocked by hanger portion 71. Moreover, a space for operating operation button 205 is secured between prong portion 73m and prong portion 73n.

Figure 18:
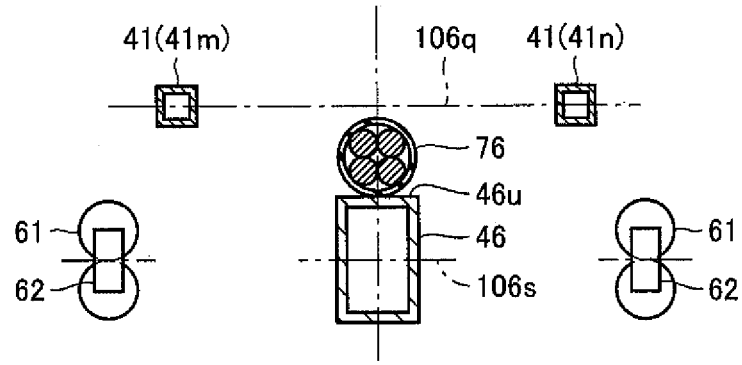
FIG. 18 is a cross-sectional view showing the used state of the support arm along the line XVIII-XVIII in FIG. 10.
Figure 19:
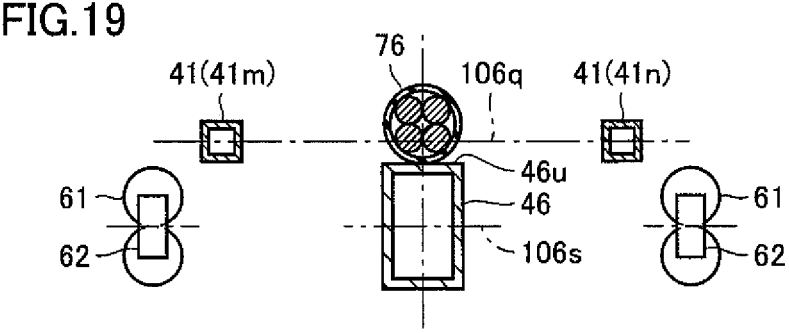
FIG. 19 is a cross-sectional view showing the accommodated state of the support arm along the line XIX-XIX in FIG. 8.

FIG. 18 is a cross-sectional view showing the used state of the support arm along the line XVIII-XVIII in FIG. 10. FIG. 19 is a cross-sectional view showing the accommodated state of the support arm along the line XIX-XIX in FIG. 8.

Referring to FIGS. 18 and 19, upper shaft 41 (upper shaft 41m, upper shaft 41n) as well as spring portion 61 and pulley 62 constituting gravity compensation apparatus 60 are arranged in a manner displaced from each other in the axial direction of central axes 106p to 106s. More specifically, spring portion 61 and pulley 62 are arranged on opposing sides of upper shaft 41 in the axial direction of central axes 106p to 106s. According to such a construction, in the accommodated state of support arm 10, upper shaft 41 can be prevented from interfering with spring portion 61 and pulley 62.

In the used state of support arm 10, upper shaft 41m, lower shaft 46, and upper shaft 41n are arranged to locate at vertices of a triangle, respectively. Upper shaft 41 and lower shaft 46 each have a hollow tube shape extending between bracket 27 and bracket 28. Upper shaft 41 and lower shaft 46 each have a substantially rectangular cross-sectional shape.

In support arm 10 in the present embodiment, cable 76 is fixed to lower shaft 46. Cable 76 is fixed to a top surface 46u of lower shaft 46. Cable 76 is arranged in the inside of a triangle formed by connecting upper shaft 41m, upper shaft 41n, and lower shaft 46 in the used state of support arm 10. By fixing cable 76 to lower shaft 46, carrying of a weight of cable 76 by upper shaft 41 can be avoided. Thus, upper shaft 41 can be lighter in weight and hence support arm 10 can be lighter in weight.

Lower shaft 46 is greater in thickness than upper shaft 41m and upper shaft 41n provided as upper shaft 41. Namely, in the case where upper shaft 41 and lower shaft 46 are cut in a plane orthogonal to a direction connecting bracket 27 and bracket 28 to each other, a length of an outer perimeter of the cut plane of lower shaft 46 is longer than a length of an outer perimeter of the cut plane of upper shaft 41m and longer than a length of an outer perimeter of the cut plane of upper shaft 41n. A weight of upper shaft 41 in addition to a weight of lower shaft 46 is imposed on lower shaft 46. Therefore, by making lower shaft 46 greater in thickness than upper shafts 41m, 41n, durability of support arm 10 can be improved. Additionally, heat generated in cable 76 can efficiently be dissipated through lower shaft 46.

Figure 20:
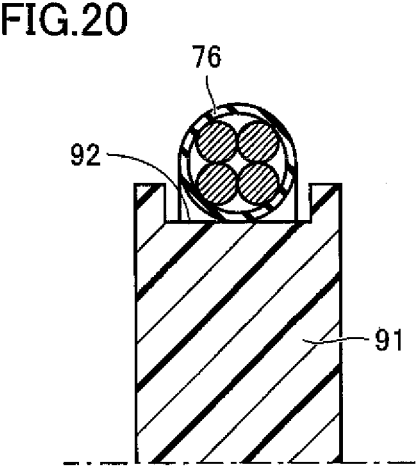
FIG. 20 is a cross-sectional view showing the support arm along the line XX-XX in FIG. 17.

FIG. 20 is a cross-sectional view showing the support arm along the line XX-XX in FIG. 17. Referring to FIGS. 17 and 20, the support arm in the present embodiment further has a guide portion 91 for guiding cable 76 routed along parallelogram linkage 40 and parallelogram linkage 30.

Guide portion 91 is provided at a position of coupling between parallelogram linkage 40 and parallelogram linkage 30, that is, in bracket 27. Guide portion 91 has a columnar shape. Guide portion 91 has a curved surface 92. Curved surface 92 is formed to extend as it curves between parallelogram linkage 40 and parallelogram linkage 30. Cable 76 is routed to extend along curved surface 92.

Since a high current flows through cable 76, a thickness of cable 76 is great. If such a cable 76 is greatly bent at the position of coupling between parallelogram linkage 40 and parallelogram linkage 30 and it is repeatedly bent in that state, there is a concern of break. In the present embodiment, however, by providing guide portion 91 at the position of coupling between parallelogram linkage 40 and parallelogram linkage 30, a bend radius of cable 76 can be set to be greater. For example, a bend radius of cable 76 is set to be at least 10 times as large as a diameter of cable 76. Thus, longer life of cable 76 can be realized.

At the position of coupling between parallelogram linkage 40, and parallelogram linkage 30, cable 76 is routed over guide portion 91 so as to pass on an outer peripheral side of a triangle formed by connecting bracket 26, bracket 27, and bracket 28. Thus, as shown in FIG. 17, even when an angle formed between parallelogram linkage 40 and parallelogram linkage 30 is made smaller, cable 76 can be prevented from being caught between the linkages.

According to the support arm in the third embodiment of this invention thus constructed, the effect described in the first embodiment can similarly be obtained. Additionally, the support arm having excellent usability and durability can be realized.

INDUSTRIAL APPLICABILITY

This invention is mainly made use of as a support arm for supporting a charge connector for a hybrid vehicle or the like.

REFERENCE SIGNS LIST 1 support arm; 21 post; 26 bracket; 27 bracket; 28 bracket; 30, 40 parallelogram linkage; 31, 31m, 31n, 41, 41m, 41n upper shaft; 36, 46 lower shaft; 46u top surface; 50, 60 gravity compensation apparatus; 51, 61 spring portion; 52, 62 pulley; 53, 63 pin; 56, 66 wire; 71 hanger portion; 72 base; 73, 73m, 73n prong portion; 74 through hole;

76 cable; 81 support shaft; 82 lock pin; 83 engagement groove; 91 guide portion; 92 curved surface; 101p, 101q, 101r, 101s, 106p, 106q, 106r, 106s central axis; 108, 116 hang-down position; 110 support shaft insertion portion; 112, 117 extension line; 114 plane; 115 central axis; 200 hybrid car; 200A body; 200B fuel supply connector; 201, 201p charge connector; 202 grip portion; 203 intermediate portion; 204 main body portion; 205 operation button; 206 connection portion; 208 engagement pawl; 210 internal combustion engine; 220 transaxle; 221 power split device; 230 fuel tank; 240 power storage device; 250 fuel supply portion; 260 electric power supply portion; 261 outer lid; 262 head portion; and 263 inner lid.

The invention claimed is:

1. A support arm for supporting a charge connector which can be connected to a vehicle, comprising:
a first arm portion provided in a freely swingable manner, the first arm portion having a first bracket, a second bracket provided at a distance from said first bracket, and an upper shaft and a lower shaft provided between said first bracket and said second bracket and pivotably coupled to said first bracket and said second bracket;
a gravity compensation apparatus having a spring portion supported by said second bracket, for generating spring force canceling, by said spring portion extending and contracting with swing of said first arm portion, gravity acting on said first arm portion;
a charge connector having a support portion supported by said first arm portion and provided to be rotatable around said support portion, said support portion being arranged at a position of a center of gravity of said charge connector, said first arm portion further having an L-shaped hanger portion connected to said second bracket, for suspending said support portion from above; and a line routed along said first arm portion and connected to said charge connector, said charge connector being held in such a position that said line is hung downward from said charge connector while external force is not applied, said charge connector having a grip portion gripped during a charging operation, and said grip portion being arranged below said hanger portion while external force is not applied to said charge connector.

2. The support arm according to claim 1, further comprising a locking mechanism provided in said charge connector, for stopping rotational motion of said charge connector with respect to said first arm portion.

3. The support arm according to claim 1, wherein said charge connector has a grip portion gripped during a charging operation, a connection portion which can be connected to the vehicle, and an intermediate portion provided to extend from said grip portion to said connection portion, and said support portion is arranged between said grip portion and said intermediate portion.

4. The support arm according to claim 1, further comprising:

a second arm portion provided in a freely swingable manner and coupled to said first arm portion;

a line routed along said first arm portion and said second arm portion and connected to said charge connector; and a guide portion provided at a position of coupling between said first arm portion and said second arm portion, for guiding said line.

5. The support arm according to claim 4, wherein said guide portion has a curved surface which extends as it curves between said first arm portion and said second arm portion, and said line is routed along said curved surface.

6. The support arm according to claim 1, wherein said first arm portion has a first shaft and a second shaft arranged in parallel at a distance from each other and constituting a parallelogram linkage mechanism, said first shaft is arranged above said second shaft when said first arm portion is positioned to extend sideward, and said support arm further comprises a line fixed to said second shaft and connected to said charge connector.

7. The support arm according to claim 6, wherein said second shaft is greater in thickness than said first shaft.

* * * * *